US007828963B1

United States Patent
Neibert et al.

(10) Patent No.: US 7,828,963 B1
(45) Date of Patent: Nov. 9, 2010

(54) POOL JET FILTER CLEANER

(76) Inventors: Patricia Neibert, 192 Eppinger Dr., Port Charlotte, FL (US) 33953; Paul Neibert, 192 Eppinger Dr., Port Charlotte, FL (US) 33953

( * ) Notice: Subject to any disclaimer, the term of this patent is extended or adjusted under 35 U.S.C. 154(b) by 68 days.

(21) Appl. No.: 12/466,061

(22) Filed: May 14, 2009

(51) Int. Cl.
*B08B 3/02* (2006.01)
*B01D 29/68* (2006.01)
(52) U.S. Cl. .................................. 210/167.12; 134/198
(58) Field of Classification Search ............ 210/167.11, 210/167.12, 167.14, 416.1, 416.2; 134/198
See application file for complete search history.

(56) References Cited

U.S. PATENT DOCUMENTS

| 3,820,552 | A | 6/1974 | Lang et al. |
| 4,652,369 | A | 3/1987 | DePolo |
| 4,834,883 | A | 5/1989 | Lake |
| 4,995,749 | A | * | 2/1991 | Gornik ........................... 401/9 |
| 5,263,503 | A | 11/1993 | St. Jean |
| 5,384,045 | A | 1/1995 | Chmielewski |
| 6,497,814 | B1 | 12/2002 | Alexander et al. |
| 6,709,581 | B2 | 3/2004 | Leckal |
| 7,032,760 | B2 | 4/2006 | Walton et al. |
| 7,311,823 | B2 | 12/2007 | Brooke |

FOREIGN PATENT DOCUMENTS

| JP | 2001-269549 A | * | 10/2001 |
| JP | 2009-78214 A | * | 4/2009 |

* cited by examiner

*Primary Examiner*—Fred Prince
(74) *Attorney, Agent, or Firm*—Richard C. Litman

(57) ABSTRACT

The pool jet filter cleaner includes a tube in fluid connection between a t-handle and a multi-directional nozzle, a coupling, sleeve, base, and shut-off valve. The cleaner works by resting the filter upon the base, inserting the coupling sleeve about the top end of the filter, and inserting the sprayer into the hollow cylindrical center of the filter. The pressurized water passes through the t-handle, down the tube, and out the multi-directional nozzle thereby cleaning the filter from the inside out.

10 Claims, 3 Drawing Sheets

POOL JET FILTER CLEANER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of pool filters, more specifically, a cleaning apparatus for pool filters.

B. Discussion of the Prior Art

As a preliminary note, it should be stated that there is an ample amount of prior art that deals with pool jet filters. As will be discussed immediately below, no prior art discloses a pool jet filter cleaner that cleans the filter internally via a tube that is inserted into the center of the filter and of which has a multi-directional nozzle.

The Alexander et al. Patent (U.S. Pat. No. 6,497,814) discloses an apparatus for cleaning a swimming pool water filter. However, the pool filter cleaner does not have a coupling sleeve that fits over the top opening of the filter, and of which prevents splashing water to exit the filter but traverse up and down with respect to both the filter and coupling sleeve.

The Lang et al. Patent (U.S. Pat. No. 3,820,552) discloses a device for cleaning a cartridge type filter in which the housing of the filter has a hollow tube with a central bore that has sprayer holes on it for washing the filter from the inside out. However, the device encompasses the filter as opposed to being inserted into the center of the filter.

The Leckal Patent (U.S. Pat. No. 6,709,581) discloses a pool 10 filter cleaner that includes a rod that the filter slides down onto and is secured in place at the top and bottom, a water hose is then connected to the rod that has sprayer holes on it, and water is sprayed through the filter to clean it. However, the filter cleaner fits over an individual fold of the filter as opposed to entering a filter having a hollow center and of which washes the filter from the inside out.

The Lake Patent (U.S. Pat. No. 4,834,883) discloses filter tubes of a swimming pool filter that are cleaned by a spray nozzle connected to a high pressure water source. However, the spray nozzle enters along a bottom position to direct high pressure Water upwards to clean the bottom of the filter ribs that do not form a circular array capable of being cleaned from a center cleaning device.

The DePolo et al. Patent (U.S. Pat. No. 4,652,369) discloses a filter cleaning system for swimming pools that utilizes a reverse water flow for cleaning clogged dirt. However, the cleaning system draws water from outside in as opposed to a cleaning nozzle that is inserted into the hollow cylinder in order to clean from inside out.

The St. Jean Patent (U.S. Pat. No. 5,263,503) discloses a filter cartridge cleaning system. However, the cleaning system uses a flow duct having equally spaced ports along the length that enables water to pass there through as opposed to a flexible tube that is inserted into the hollow cylinder of the filter of which includes a multi-directional nozzle.

The Brooke Patent (U.S. Pat. No. 7,311,823) discloses a pool filter cleaning device, which involves a sprayer nozzle to wash the exterior of a filter.

The Chmielewski et al. Patent (U.S. Pat. No. 5,384,045) discloses a cleaning device for dirty swimming pool filters, which does not involve a flexible hose that is inserted into a hollow cylinder of a filter and of which has a multi-directional nozzle.

The Walton et al. Patent (U.S. Pat. No. 7,032,760) discloses a backwash flushing filter. However, the filter is not a cleaning system that involves inserting a multi-directional spray nozzle into the center hollow cylinder of a filter in order to clean the filter from the inside out.

While the above-described devices fulfill their respective and particular objects and requirements, they do not describe a pool jet filter cleaner that includes a coupling sleeve, flexible tube having a multi-directional nozzle of which is inserted into the central hollow cylinder of a filter in order to wash said filter from the inside out. In this regard, the pool jet filter cleaner departs from the conventional concepts and designs of the prior art.

SUMMARY OF THE INVENTION

The pool jet filter cleaner includes a tube in fluid connection between a t-handle and a multi-directional nozzle, a coupling sleeve, base, and shut-off valve. The cleaner works by resting the filter upon the base, inserting the coupling sleeve about the top end of the filter, and inserting the sprayer into the hollow cylindrical center of the filter. The pressurized water passes through the t-handle, down the tube, and out the multi-directional nozzle thereby cleaning the filter from the inside out.

An object of the invention is to provide a pool jet filter cleaner that is cleaned from the inside out.

A further object of the invention is to provide a coupling sleeve and base that insures splashing water wont exit the openings of the filter, but rather through the filter thereby ensuring the cleaning of the filter.

These together with additional objects, features and advantages of the pool jet filter cleaner will be readily apparent to those of ordinary skill in the art upon reading the following detailed description of presently preferred, but nonetheless illustrative, embodiments of the pool jet filter cleaner when taken in conjunction with the accompanying drawings.

In this respect, before explaining the current embodiments of the pool jet filter cleaner in detail, it is to be understood that the pool jet filter cleaner is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pool jet filter cleaner. It is therefore important that the claims be regarded as including such equivalent construction insofar as they do not depart from the spirit and scope of the pool jet filter cleaner. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
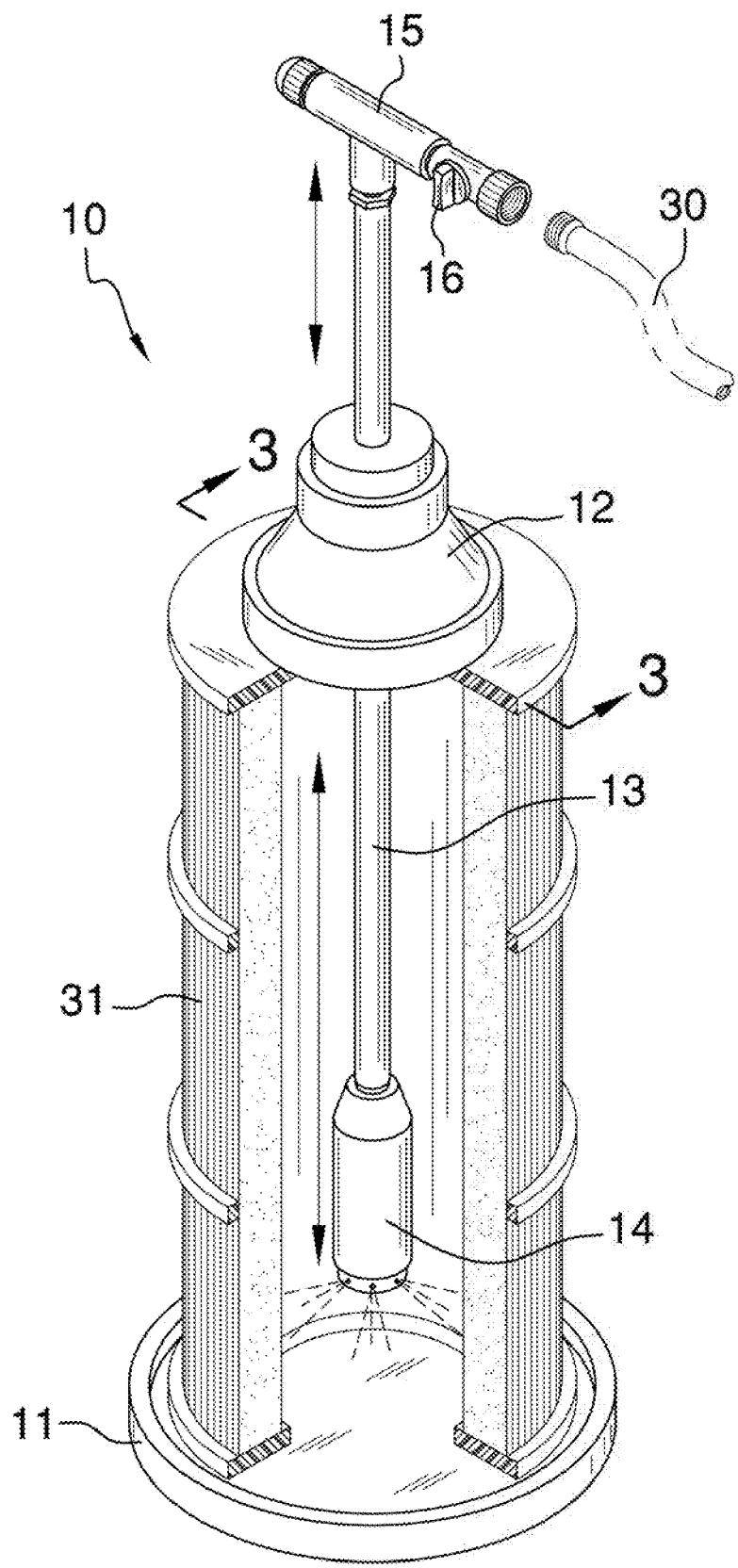
FIG. 1 illustrates an isometric, cut-away view of the filter with the pool jet filter cleaner in use.
Figure 2:
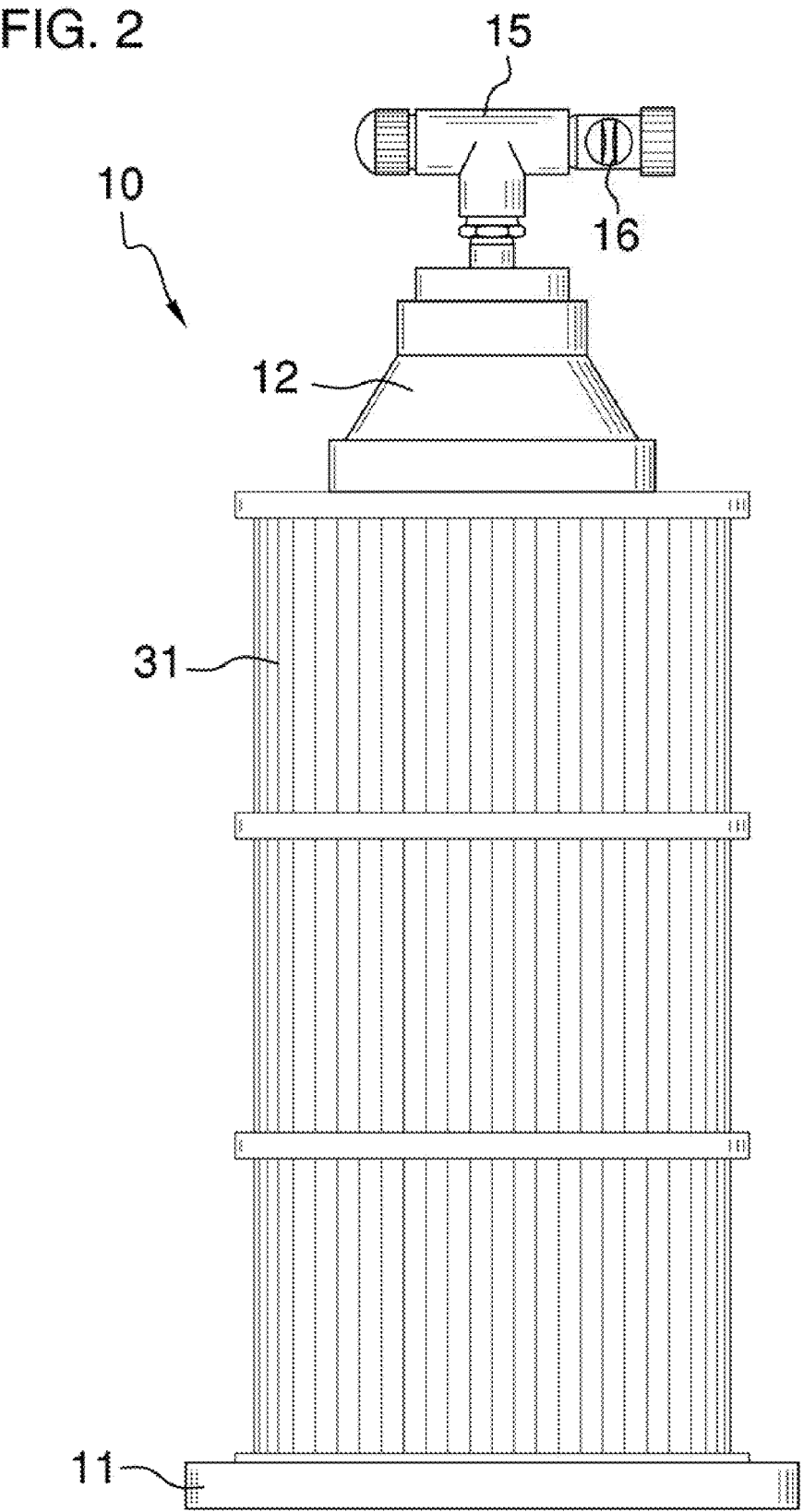
FIG. 2 illustrates a front view of the pool jet filter cleaner installed upon a pool jet filter with the tube and the multi-directional nozzle extended all of the way down the hollow cylinder of the filter.
Figure 3:
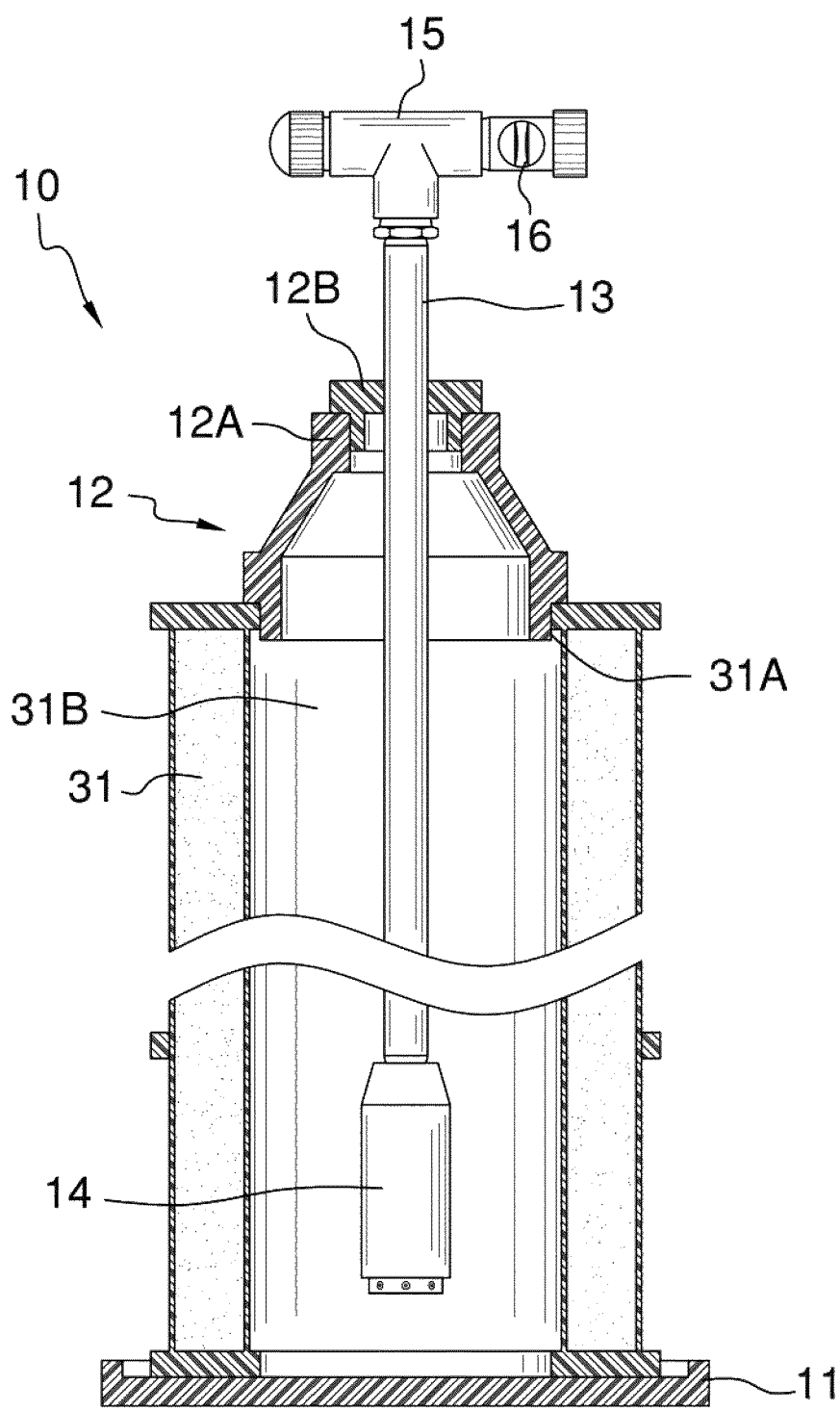
FIG. 3 illustrates a cross-sectional view of the invention along line 3-3 in FIG. 1.

Detailed reference will now be made to the preferred embodiment of the present invention, examples of which are illustrated in FIGS. 1-3. A pool jet filter cleaner (hereinafter invention) 10 includes a base 11, a coupling sleeve 12, a tube 13, a multi-directional nozzle 14, a handle 15, and a valve 16.

The valve 16 is in fluid connection between a hose 30 and the handle 15. The tube 13 is in fluid connection between the handle 15 and the multi-directional nozzle 14.

A filter 31 is placed upon the base 11, and the coupling sleeve 12 is placed into a top end 31A of the filter 31. Next, the multi-directional nozzle 14 and flexible tube 13 are inserted into a hollow cylindrical opening 31B of the filer 31. Next, pressurized water is dispersed about the hollow cylindrical opening 31B via the multi-directional nozzle 14. Please note that an end user will then raise and lower the handle 15 in order for the multi-directional nozzle 14 to direct pressurized water along the entire length and circumference of the filter 31.

The movement of the handle 15 will insure the entire interior surface of the filter 31 is adequately washed via the pressurized water. It shall be noted that the washing of the interior surface of the filter 31 via pressurized water is a primary object of the invention 10. Furthermore, the direction of the pressurized water will clean the filter 31 from the inside out, which is a second object of the invention 10.

It shall be further noted that the multi-directional nozzle 14 shall direct the pressurized water radially, which preserves the available pressure of the water.

It shall be noted that the coupling sleeve 12 is depicted as a two-part assembly involving a base collar 12A and a top plug 12B. However, it shall be noted that the coupling sleeve 12 may involve a single piece and not two. The top plug 12B insures pressurized water does not escape from the inside of the filter 31 whereas the base collar insures an adequate fit about the top opening 31A of the filter 31.

However, it shall be noted that the coupling sleeve 12 may be depicted as a single piece that is fitted about the tube 13, such that the coupling sleeve 12 may not be come disengaged from the tube 13 on account of the geometries involved, e.g., the central hole of the coupling sleeve 12 versus the handle 15 and multi-directional nozzle 14.

The overall size of the multi-directional nozzle 14 must be less than the overall diameter of the top opening 31A of the filter 31 in order for the multi-directional nozzle 14 to attain ingress and egress from the filter 31.

It shall be noted that the valve 16 is a feature of the invention 10 and is not a required element in that the invention 10 can operate absent the valve 16.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A pool jet filter cleaning system comprising:
   (a) a handle;
      wherein a pressurized water source is in fluid connection with the handle;
   (b) a tube;
      wherein the tube is in fluid connection with the handle;
   (c) a multi-directional nozzle;
      wherein the multi-directional nozzle is in fluid connection with the tube;
      wherein both the tube and multi-directional nozzle are inserted into a top opening of a pool jet filter in order to direct pressurized water onto an interior surface of the pool jet filter thereby cleaning said filter from the inside out;
   (d) a coupling sleeve;
      wherein the coupling sleeve is positioned about the top opening of the filter in order to prevent pressurized water from exiting the top opening of the filter.

2. The filter cleaning system as described in claim 1 wherein the multi-directional nozzle directs pressurized water radially only.

3. The filter cleaning system as described in claim 1 wherein a base is included and positioned underneath the filter in order to prevent water from exiting a bottom opening of the filter being cleaned.

4. The filter cleaning system as described in claim 1 wherein a valve is in fluid connection between the handle and the pressurized water source.

5. The filter cleaning system as described in claim 1 wherein pressurized water enters through the handle, down the tube, and out the nozzle onto the interior surface of the filter;
   wherein the handle can be raised or lowered to direct pressurized water over the entire interior area of the filter.

6. A pool jet filter cleaning system further comprising:
   a handle in fluid connection with both a pressurized water source and a tube;
   a multi-directional nozzle that is in fluid connection with said tube;
   wherein the multi-directional nozzle is inserted into a top opening of a pool jet filter in order to direct pressurized water onto an interior surface of the pool jet filter thereby cleaning said filter from the inside out;
   a coupling sleeve is positioned about the top opening of the filter in order to prevent pressurized water from exiting the top opening of the filter, and is further comprised of a two-part assembly that enables the flexible hose and multi-directional nozzle to pass through said coupling sleeve.

7. The filter cleaning system as described in claim 6 wherein the multi-directional nozzle directs pressurized water radially only.

8. The filter cleaning system as described in claim 6 wherein a base is included and positioned underneath the filter in order to prevent water from exiting a bottom opening of the filter being cleaned.

9. The filter cleaning system as described in claim 6 wherein a valve is in fluid connection between the handle and the pressurized water source.

10. The filter cleaning system as described in claim 6 wherein pressurized water enters through the handle, down the tube, and out the nozzle onto the interior surface of the filter;
wherein the handle can be raised or lowered to direct pressurized water over the entire interior area of the filter.

\* \* \* \* \*